UNITED STATES PATENT OFFICE.

HERMANN PLAUSON, OF HAMBURG, GERMANY, ASSIGNOR TO D. R. ROTMAN, OF NEW YORK, N. Y.

MANUFACTURE OF DISPERSOIDS, COLLOID POWDER AND MASSES THEREFROM.

1,392,849. Specification of Letters Patent. Patented Oct. 4, 1921.

No Drawing. Application filed February 8, 1921. Serial No. 443,423.

*To all whom it may concern:*

Be it known that I, HERMANN PLAUSON, Esthonian subject, residing at Hamburg, Germany, have invented certain new and useful Improvements in the Manufacture of Dispersoids, Colloid Powder and Masses Therefrom, for which I have filed an application in Germany August 29, 1918, of which the following is a specification.

Various processes are known for transforming solid colloids in the "gel" form into finely divided soluble or insoluble powders. Examples of such colloids are glue, gelatin, agar-agar, tragacanth, gum, starch, dextrin, carrageen moss, etc., or proteins such as casein, albumen, hemoglobin, yeast, or cellulose esters such as formyl, acetyl or nitrocellulose esters. These substances belong to the group of colloids termed emulsoid colloids or colloids in the gel form and a characteristic property is that they possess the power of dissolving or more strictly speaking of "swelling" when placed in suitable liquids which convert them into colloidal solutions of the gel type and these colloidal solutions are usually spoken of industrially as "solutions" in the same way as solutions of bodies which are not in the colloidal state. Colloidal solutions are also known of the suspensoid or "sol" type. In these cases the solid is present in a form such that it does not resemble an ordinary solution because the colloidal solution cannot be obtained by merely agitating the solid with a solvent. A typical example of such a colloidal "sol" is the colloidal solution of graphite in water containing tannin. When such a sol is treated with small quantities of electrolyte the solid is usually precipitated irreversibly so that the precipitate cannot be redissolved whereas colloids of the gel type are precipitated reversibly, *i. e.* the precipitate can be again brought into colloidal solution by merely treating with a solvent. The commonest method of preparing colloidal solutions of the sol type has hitherto been to pass an electric arc between electrodes of a metal in water or another liquid which is termed the dispersion medium when a "hydrosol" is obtained in the case of water as dispersion medium or an "organosol" in the case of an organic liquid as dispersion medium. This process is not applicable to substances which do not conduct electricity.

Now it has hitherto been proposed to prepare finely divided powders from colloids of the gel type by first dissolving them in a suitable solvent and then spraying or finely distributing this solution within a body of liquid which is not a solvent for the colloid in question when a finely divided precipitate is obtained. Under certain conditions, a sol can be obtained in this way. For example if a solution of mastic in alcohol is poured into water which is a non-solvent therefor, a collodial solution resembling the sol type is obtained.

This process has the disadvantage that two solvents are always necessary for the preparation of powders in the manner described; one liquid as a solvent and a second as a non-solvent or dispersion medium and this second liquid should not dissolve or swell the colloid. For example to prepare gelatin powder in this way, water may be used as solvent and an organic hydrocarbon such as benzene, petroleum or mineral oil as dispersion medium in order to separate the individual particles of gelatin. Consequently it is necessary to separate both these liquids from one another and from the powder, and it is difficult to remove the solvent completely without causing the powder to adhere afresh.

Now according to the present invention, it is possible to obtain colloidal powders without previously dissolving the raw material in an extremely simple manner which is well adapted for operation on the large scale by mechanical means with the result that a fine disperse powder is obtained which can be admirably used for the manufacture of objects of all kinds. According to the present invention the colloid in question is not dissolved in a solvent but is treated in the solid gel form with a large quantity of a non-solvent as dispersion medium and subjected to such intensive mechanical disintegration or emulsification that the colloid is dispersed within the liquid in the suspensoid or sol form, or at any rate a form closely approximating thereto. Such dispersions can be kept for a long time without adherence of the particles and they behave in a similar manner to organosols or hydrosols. It has been found that this action can only be obtained by treatment in disintegrators running at very high speed; in treating colloids of this kind, a peripheral speed of over 300 meters per minute is essential and preferably a peripheral speed of over 2000 up to 3000 meters per minute is employed. Such a disintegrator is the colloid mill described in my co-pending application Serial No. 437,117.

By such treatment the solid colloid actually assumes a state of (colloidal) dispersion and the effect is not one of mere grinding which can be seen from the fact that by suitable choice of dispersion medium and sufficient treatment in the disintegrator, the physical properties of a sol are obtained; the dispersed particles remain suspended in the dispersion medium and can be separated or coagulated by the addition of a suitable electrolyte.

It has been found desirable to add to certain colloids during the treatment small quantities, about 1 to 5%, of a suitable soap or a substance in which the colloid in question either dissolves or swells. These agents only accelerate the dispersion and their addition is not absolutely essential.

It was not known that solid colloid masses (gels) could be treated in a simple manner in a disintegrator to transform them into an excessively finely dispersed sol form and in liquids which do not dissolve the raw material. This treatment cannot be in any way compared with the process of grinding such materials in the ordinary slow speed dry or wet grinding mills, kollergangs, or roller mills, since a colloidal suspension is never obtained at low speed grinding, especially since in such grinding a large excess of dispersion medium is not usually employed.

The invention is therefore to be regarded as a new general process for the manufacture of dispersoids from colloids in the gel form and in many cases it is applicable to commercial operation on the large scale.

Examples of suitable applications are the waste material obtained in the manufacture of various objects from the above mentioned solid colloids since in this way it is possible to use them again without subjecting them to an expensive process of solution and from the disperse powder so obtained it is possible to obtain new objects of various kinds by molding dry. Obviously the colloids themselves instead of their waste products can also be worked up in the same manner.

The disperse powder obtained from gelatin according to the present invention can be used in photography and pharmacy or for foods or adhesives and the products obtained from cellulose esters can be applied for the manufacture of varnishes and artificial leather. Nutritive bodies can be obtained from protein, hemoglobin, yeast, etc.; and adhesive bodies of plastic masses, artificial wood, artificial leather can also be made. The process is illustrated by the following examples.

*Example 1.*

1 part of neutral soap is dissolved in 100 parts of 96% alcohol and then 5 to 10 parts of previously coarsely comminuted gelatin is added. This mixture is disintegrated at very high speed for from 2 to 5 hours in a mill provided with beaters having a liquid-tight stuffing box about its axis. Continuous treatment is then obtained by using a colloid mill or by providing a pump to circulate the alcohol-gelatin mixture through the disintegrator to a suitable reservoir and back again to the disintegrator.

In the course of time an excessively fine dispersion of gelatin in alcohol is obtained. The addition of small quantities of soap or also of water serves to shorten the time of treatment. The desired degree of dispersion is obtained more rapidly in this way. The excess of alcohol can then be removed by centrifugalization or the gelatin can be allowed to settle after the addition of small quantities of salts or acids soluble in alcohol when it is filtered off. If the gelatin was pure originally, it can then be used at once or sold in the form of paste, but if it is originally contaminated with fat or resin, it must be washed in anhydrous alcohol till the soluble portions are removed. It can be converted into a homogeneous powder if the remainder of the alcohol is distilled off at a temperature not higher than 30 to 40° C. under continual stirring. The excessively fine homogeneous powder so obtained can be employed with particular advantage for different purposes in nutritive, photographic or pharmaceutical chemistry or as an adhesive or a finishing agent in textile work, etc. It can be molded into various objects alone or with suitable fillers under pressure and or heating to 100 to 125° C. without the necessity of adding a binding agent.

Instead of alcohol, another organic liquid can be employed as dispersion-medium, for example benzene and its homologues, benzin, petroleum, chlorinated hydrocarbons, ketones or oils. But the latter must be extracted from the organosol so obtained by low boiling hydrocarbons and the extraction medium removed by distillation under reduced pressure since the oils cannot be distilled off at low temperatures and otherwise pasty and not pulverulent end products would be obtained. In the manufacture of dispersoids from solid colloids, the properties of the final products can be simultaneously changed, e. g. gelatin can be made insoluble in water before or after transformation into the disperse state without interfering with the dispersion. This result is obtained by adding a substance which has the property of making the gelatin insoluble either during disintegration or after the desired degree of dispersion has been obtained. Such substances are known, for example formaldehyde, polymers thereof, chromates, certain salts of aluminium, tannin or the like. It is found that the degree of dispersion of the final products need not be substantially decreased in this way. These dispersoids insoluble in water are particularly suitable either direct or after addition of resins, oils or mineral or organic powders or fibrous materials as fillers for the manufacture of water-resistant objects which can be molded by simple pressure and heat.

Instead of gelatin, other solid colloids can be employed under the same conditions, e. g. glue, agar-agar, tragacanth, gum, starch, dextrin, carrageen moss, casein, albumen, yeast, phenol condensation products, hard rubber and the like so that fine powders are obtained and various objects are obtained therefrom or from mixtures containing the powder.

*Example 2.*

100 parts of benzin and 10 to 15 parts of anhydrous portein are mixed and disintegrated for from 1 to 2 hours as in Example 1. During this time a sufficiently fine dispersion of protein in benzene is obtained. If the protein was pure, pure protein powder can be obtained direct by centrifugalization and subsequent distillation under reduced pressure at a temperature not exceeding 30° with continual stirring. If fats, soaps or the like substances were present in the protein, the powder must be washed in fresh quantities of benzin, alcohol or ether on a centrifuge until the washed liquid runs off clear. Such washing also effects a refining of the protein powder.

Formaldehyde, tannin or other protein coagulants may be added to the benzin-protein mixture before or after dispersion of the protein when the protein is made insoluble in water or coagulated. This coagulation can also be obtained by warming to 60 or 80° during disintegration without danger of causing the powder to be too coarse, in this case high boiling benzin should be used as dispersion medium. The protein powder can be employed in the same way and for the same purposes as gelatin powder. Instead of benzin it is possible to use alcohols, ketones, benzene, xylene, etc., or chlorinated hydrocarbons in many cases.

In the same way it is possible to work up hemoglobin, casein, yeast, starch, meal, etc., to homogeneous disperse powders.

*Example 3.*

100 kg. of xylene, 3.5 kg. of acetone and 5 to 10 kg. of acetone-soluble cellulose ester, e. g. the formyl or acetyl cellulose ester, are disintegrated as in Example 1 for several hours.

After this time the cellulose ester is extremely finely dispersed. After further treatment as in Example 1 a dust-fine cellulose ester powder is obtained which serves as an excellent raw material for the manufacture of varnishes or artificial leather, etc. By pressing and heating under suitable pressure with or without addition of other pulverulent homogeneous substances such as natural or artificial resins, asphalts, water-insoluble caseins, starch, albumen, yeast, etc., objects of the most varied properties and appearance can be manufactured direct.

Nitro-cellulose esters or the like can be treated in similar manner so as to produce the finest powder. When treating acetone-insoluble cellulose esters, the dispersion can be accelerated by dichlorhydrin or tetrachlorethane in small quantities instead of acetone.

Xylene can be replaced by other liquids e. g. benzene and its homologues, benzin, petroleum, turpentine and liquid mineral oils, etc., can be used.

Chlorinated hydrocarbons, ketones, glycols, alcohols, esters, etc., can be added in small quantities up to 13% as dispersion accelerators.

Water can be employed as dispersion medium for solid colloidal masses which are insoluble therein. In this case, 3 to 5% of acetone or alcohol or other solvent can be added with 1 to 2% of soap as dispersion accelerator. The soap can here be replaced by a water-soluble colloid such as gelatin, glue protein or casein.

Objects can also be made from the above mentioned dispersoids by mixing the powder with fillers such as wood, asbestos, graphite, colored earths, wool, thread, paper, leather or textile waste of different kinds; these fillers are treated with the dispersoids suspended in their dispersion medium, the dispersion medium is evaporated preferably *in vacuo* and the complete powder so obtained is pressed into various objects, according to the choice of the new materials, it is possible to obtain objects which are resistant to electricity, moisture, etc.

I declare that what I claim is:—

1. Process for the manufacture of dispersoids consisting in intensively mechanically disintegrating soluble colloids (gel type) with a non-solvent.

2. The process of intensively disintegrating a soluble colloid gel in a non-solvent to yield a colloidal solution of the sol type.

3. The process of converting colloids from the gel form to the sol form by intensive mechanical treatment in a non-solvent.

4. The process of preparing a colloid powder which consists in intensively disintegrating the colloid in a non-solvent, and evaporating the solvent at low temperature.

5. The process as claimed in claim 1 in which a dispersion accelerator is added.

6. A process as claimed in claim 1 in which an emulsifying agent such as a soap is added.

7. A process as claimed in claim 1 in which a limited quantity of a solvent agent is added substantially as described.

8. A process as claimed in claim 1 in which a coagulating agent is added in presence of a small quantity of a solvent.

9. The process of preparing a colloid powder which includes mechanically converting a gel colloid into a sol in a non-solvent liquid and adding a coagulating agent thereto.

10. A process as claimed in claim 1 in which a substance is added which reacts with the colloid e. g. a hardening agent and coagulating the sol.

11. The process of preparing a colloid powder which includes mechanically converting a gel colloid into a sol in a non-solvent dispersion medium and adding a hardening agent.

12. The process of forming objects from colloids which comprises converting a colloid gel into a colloid sol by disintegration in a non-solvent, removing the non-solvent and molding the colloid powder by pressure.

13. The process of forming objects from colloids which comprises converting a colloid gel into a colloid sol by disintegration in a non-solvent, removing the non-solvent and molding the colloid powder in presence of a filler by pressure.

14. Colloid powders prepared by mechanical conversion of a gel colloid into a sol colloid in a non-solvent dispersion medium.

15. Colloidal solutions prepared by mechanical conversion of a gel colloid into a sol colloid in a non-solvent dispersion medium.

In witness whereof, I have hereunto signed my name this 26th day of January 1921.

HERMANN PLAUSON.